United States Patent
Aonuma

[11] Patent Number: 6,091,053
[45] Date of Patent: Jul. 18, 2000

[54] HEAT-RESERVING CONTAINER FOR PIZZA AND FURNACE FOR THE SAME

[75] Inventor: Saburo Aonuma, Tokyo, Japan

[73] Assignee: Sataco Co., LTD, Tokyo, Japan

[21] Appl. No.: 09/252,475

[22] Filed: Feb. 18, 1999

[30] Foreign Application Priority Data

Feb. 19, 1998 [JP] Japan .................................. 10-054331

[51] Int. Cl.⁷ ...................................................... A21B 1/52
[52] U.S. Cl. ........................... 219/387; 219/386; 219/530; 126/400; 392/339
[58] Field of Search .................................... 219/386, 387, 219/395, 398, 399, 428, 530, 540; 126/400, 337 R, 263.01; 392/339, 340, 346

[56] References Cited

U.S. PATENT DOCUMENTS

| 4,580,035 | 4/1986 | Luscher | 219/398 |
| 4,806,736 | 2/1989 | Schirico | 219/386 |
| 5,125,391 | 6/1992 | Srivastava et al. | 126/246 |
| 5,884,006 | 3/1999 | Frohlich et al. | 392/339 |

FOREIGN PATENT DOCUMENTS

| 4-124972 | 11/1992 | Japan . |
| 7-241246 | 9/1995 | Japan . |
| 8-150081 | 6/1996 | Japan . |

*Primary Examiner*—Teresa Walberg
*Assistant Examiner*—Shawntina Fuqua
*Attorney, Agent, or Firm*—Armstrong, Westerman, Hattori, McLeland and Naughton

[57] ABSTRACT

A heat-reserving container for pizza comprising a disc case having a flat circular portion, with a resin-made heat reservoir stored therein is disclosed. The entire surface, of the pizza can be in contact with the flat portion of the heat-reserving container. Also disclosed is a furnace for the above-mentioned heat-reserving container for pizza comprising heating plates each having an interval capable of storing the heat-reserving container for pizza to form multi-layered racks, each heating plate having a heater accommodated therein whose temperature is controlled individually, which can be securely inserted into the furnace body and is heat-reserved as well as the defective movement of the limit switch can be prevented.

9 Claims, 8 Drawing Sheets

HEAT-RESERVING CONTAINER FOR PIZZA AND FURNACE FOR THE SAME

FIELD OF THE INVENTION

The present invention relates to a heat-reserving container for pizza to be used for delivering a pizza in a hot state and a furnace for the heat-reserving container.

BACKGROUND OF THE INVENTION

In convention in order to delivery a pizza which has been cooked by a cooker such as an oven to an aimed site while maintaining the hot state, it has been known to utilize a container made of a material having good heat reserving properties (Japanese Patent Laid-Open No. 8-150081).

In addition, techniques have also been known for delivering a food with its hot state in which a heat-reserving box having a battery and a heater is used (Japanese Patent Laid-Open No. 7-241246 and Japanese Utility Model Laid-Open No. 4-124972).

Further, a device has been made in which a chemical heating element is used instead of the battery and heater (Japanese Utility Model Laid-Open No. 61-74564).

However, these techniques are disadvantageous in that even if any material having very good heat reserving properties is used to produce a container for pizza, there is a limitation for the heat reserving properties, for example, in such a case where the site to be delivered is very far or in such a case where it takes much times due to heavy traffic, resulting in the pizza getting cold.

It should be absolutely avoided to deliver a pizza at breakneck speed for the purpose of preventing the pizza form getting cold, in terms of falling into the dangerous situation of the life.

An attempt has been made for solving the problem to utilize a heat-reserving device having a battery and a heater, leading to solution of the problem to some extents. However, the device, which has a complicated construction, leads to new disadvantages such as expensive cost and heavy weight.

As for the use of a chemical heating element for the purpose of heat reservation, there is a problem that the chemical heating element can not be used again.

SUMMARY OF THE INVENTION

The present invention has been made in light of the above situations, and an object of the present invention is to provide an inexpensive heat-reserving container for pizza capable of recycling, which can uniformly keep a pizza having a relatively large area in its hot state, and to provide a furnace for such a heat-reserving container for pizza.

According to the first aspect of the present invention, there is provided a heat-reserving container for pizza comprising a disc case having a flat circular portion, with a resin-made heat reservoir stored therein.

According to the second aspect of the present invention, the heat-reserving container for pizza may have a construction that a plurality of supporting members which are pierced through the heat reservoir and which communicate insides of said flat disk portion with each other.

According to the third aspect of the present invention, the heat-reserving container for pizza may have a construction that a through-hole is formed into the case and only a gas is penetrated into the through-hole.

According to the fourth aspect of the present invention, the heat-reserving container for pizza may have a construction that a handle is provided on said case in such a manner that the handle is projected on the outskirts of the case and, at the same time, a hole for handle is provided inside of the said handle so that a prescribed space is formed between the case inside of the hole for handle and the disk.

According to the fifth aspect of the present invention, there is provided a furnace for the heat-reserving container for pizza mentioned above comprising heating plates each having an interval capable of storing the heat-reserving container for pizza to form multi-layered racks, each heating plate having a heater accommodated therein whose temperature is individually controlled.

According to the sixth aspect of the present invention, the furnace for the heat-reserving container for pizza may have a construction that each of the multi-layered racks has a slope where the height of the inlet side is higher than that of the inner part.

According to the seventh aspect of the present invention, the furnace for the heat-reserving container for pizza may have a construction that each of said heater is heated to a predetermined upper limit temperature in an initial state over a period of a initial heating time, and after the temperature reach the upper limit temperature, the heater is heated again for a heating time, which is ⅓ the initial heating time or less, after the same period as the initial heating time is elapsed.

DESCRIPTION OF THE PREFERRED EMBODIMENTS

The present invention will now be described by referring to the attached drawings.

Figure 1:
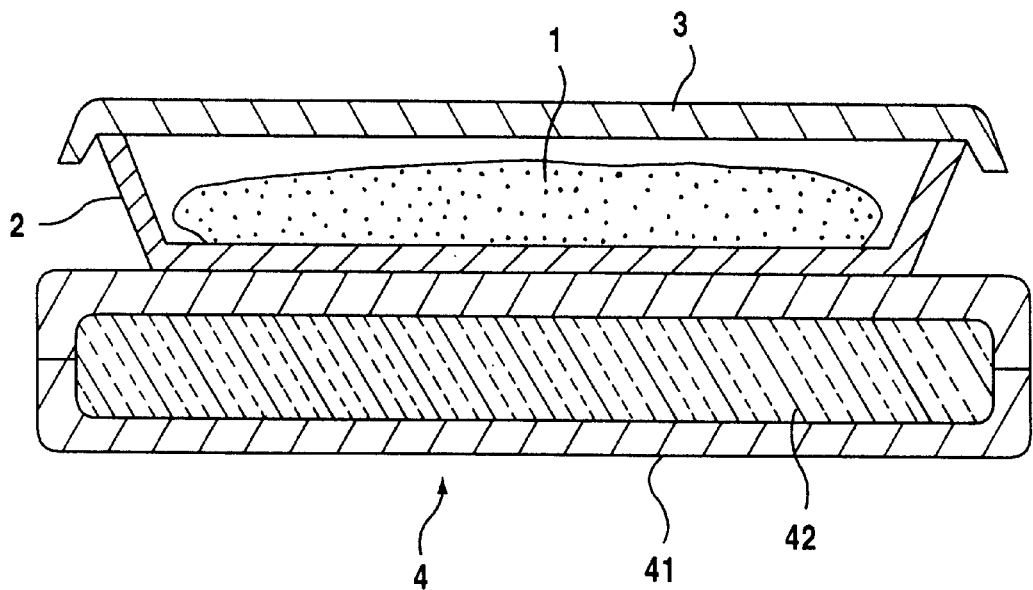
FIG. 1 is a cross-sectional view of a heat-reserving container for pizza according to the first embodiment of the present invention and shows the state where a pizza is placed.

FIG. 1 is a cross-sectional view of a heat-reserving container for pizza according to the first embodiment of the present invention and shows the state where a pizza is placed.

In FIG. 1, a hot pizza 1 which have been cooked is stored in a container 2 made, for example, of aluminum foil, is covered with a cover 3 made of the aluminum foil, and is placed on a heat-reserving container 4 for pizza. The heat-reserving container 4 for pizza is stored in a disk case 41 having a circular flat portion. The disk 42 is composed, for example, of a resin material having an anchor effect construction which is stable and capable of injection molding, such as a high-density polyethylene having an antioxidant and an agent for preventing heat curing blended therewith. The case 41 is also made of a heat resistant resin material such as Teflon.

When the heat-reserving container 4 for pizza is heated on a furnace 7, which will be described latter on, the pizza 1 placed on the heat-reserving container 4 for pizza is warmed by means of heat radiation from the disk 41 during the course of the delivery, because the high density polyethylene possesses a property that absorption and radiation of heat are repeated at a constant temperature in a stable cycle, considering its specific heat curve. This prevents a pizza from being rapidly cooled.

Since the entire surface of the flat portion of the case 42 is in contact with the bottom of the container 2, the pizza 1 can be uniformly warmed through the heat conduction from the case 42.

Figure 2:
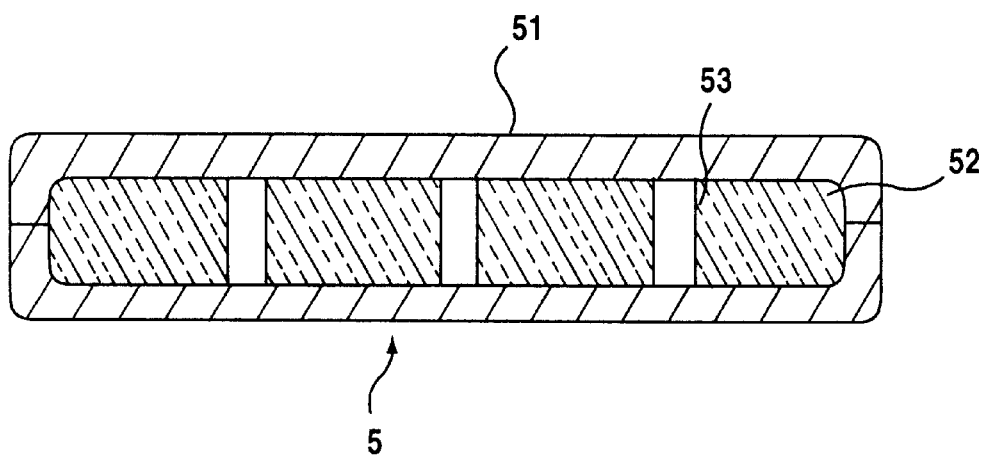
FIG. 2 is a cross-sectional view of a heat-reserving container for pizza according to the second embodiment of the present invention.

FIG. 2 is a cross-sectional view of a heat-reserving container 5 for pizza according to the second embodiment of the present invention. The heat-reserving container 5 for pizza according to this embodiment has a construction that a disk 52 having a through hole, into which plurality of supporting rods 53, are inserted into a case 51 connected to two dishes having the same size in face-to face manner.

Consequently, heat-reserving container 5 for pizza has a construction that upper and lower flat portions of the case 51 are connected by means of the supporting rods 53. In this construction, deformation of the flat portions into an arch state due to the expansion of the and between the case 51 and the disk 52 can be prevented when heat-reserving container 5 for pizza is heated on the furnace 7. Further since the bottom of the case 2 for storing the pizza can be kept in contact with the entire surface of the flat portions, the entire surface of the pizza 1 can be heat-reserved. This results in the prevention of the situation that the middle portion of pizza is hot, but surrounding portion is cold.

Figure 3:
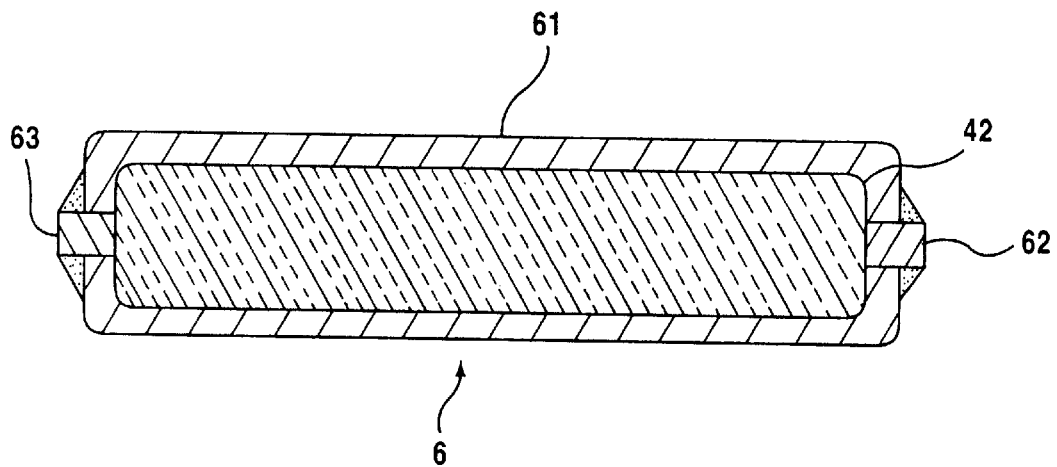
FIG. 3 is a cross-sectional view of a heat-reserving container for pizza according to the third embodiment of the present invention.

FIG. 3 is a cross-sectional view of a heat-reserving container 6 for pizza according to the third embodiment of the present invention.

In the heat-reserving container 6 for pizza according to this embodiment, a filter 62 through which only a gas can be passed is provided on the side of the case 61, and a disk 42 made of a resin is provided inside thereof.

In the case 61, two through-holes are formed on the sides. Into one through-hole, the filter 52 for only passing a gas, for example, made of a sintered metal is inserted. The other through-hole is preferably fitted with a plug 63. In this case, the filter 62 is press fitted into the case 62 and the plug 63 is fused to form the heat-reserving container 6 for piazza.

The plug 63 is for the purpose of blocking the inlet for injecting a resin in the form of a gel using an injection molding when the disk 42 is stored in the case 61.

In this construction, it is also possible to prevent, the deformation of the flat portions of the case 61, because the filter 62 breaths the swelling and shrinkage of air caused by heating the heat-reserving container 6 for pizza on the furnace 7 and cooling of the heat retaining container 6 for pizza during the course of the delivery.

Figure 4:
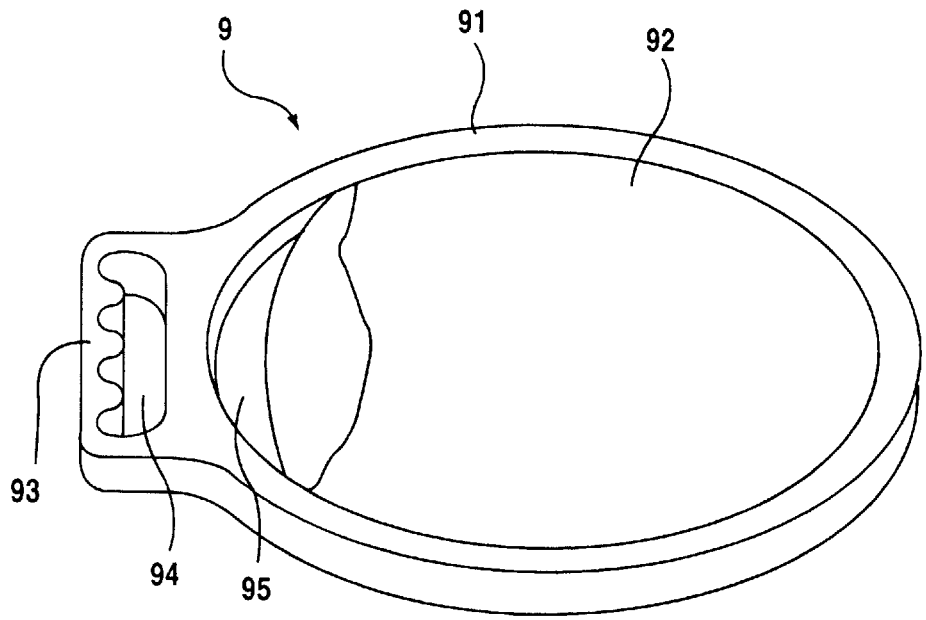
FIG. 4 is a perspective view of a heat-reserving container for pizza according to the fourth embodiment of the present invention.

FIG. 4 is a perspective view of a heat-reserving container 9 for pizza according to the fourth embodiment of the present invention.

As shown in the figure, this heat-reserving container 9 for pizza provides a handle 93 on a part of the outskirts in such a manner that the handle is projected on the outskirts of the case At the same timer a hole for handle 94 is formed inside of the handle 93 in order to be easily handled. A semicircular space 95 is formed between the case 91 and the disk 94. The space 95 possesses a radiation function not so as to transmit the heat from the heated disk 92 to the handle 93 in the case of heating the heat-reserving container 9 for pizza on the furnace 7, Next, embodiments of the furnaces for heating the above-mentioned heat-reserving containers 4, 5, 6, and 9 for pizza will now be described.

Figure 5:
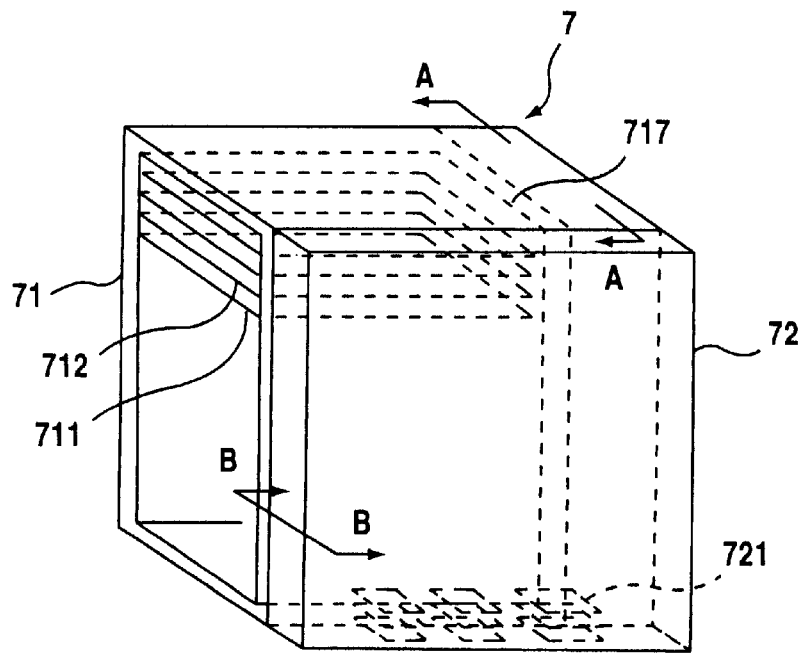
FIG. 5 outlines a furnace for a heat-reserving container for pizza according to the present invention.
Figure 6:
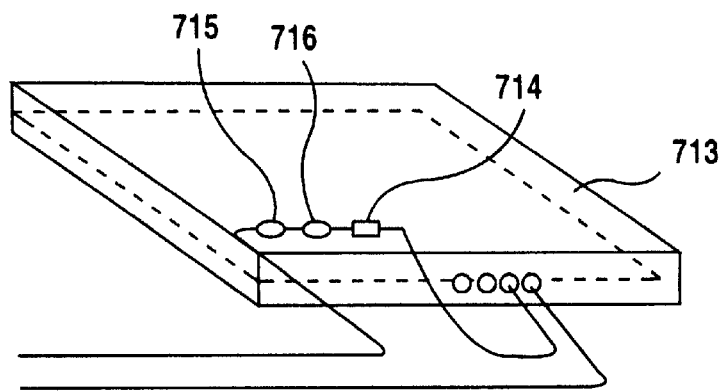
FIG. 6 outlines a rack plate.
Figure 7:
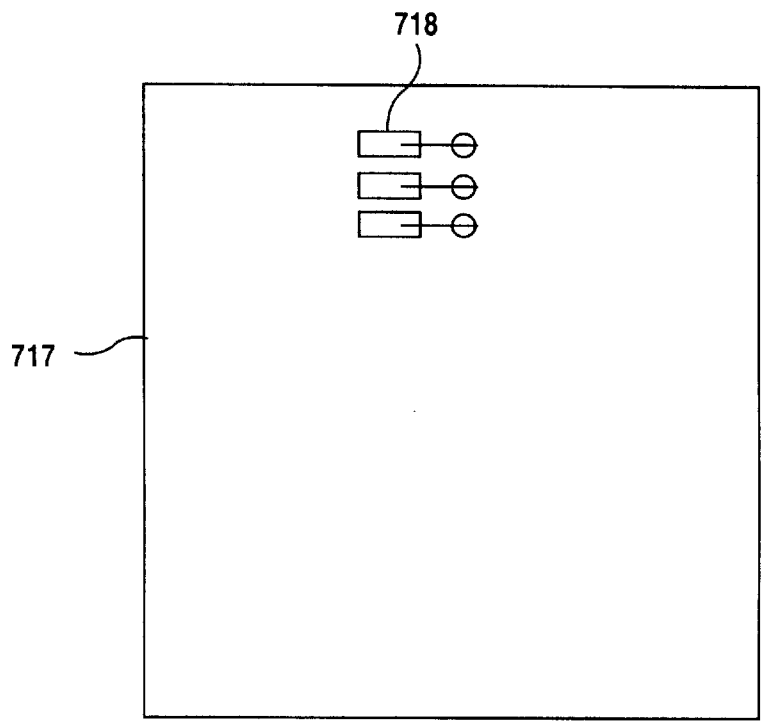
FIG. 7 is a sectional view taken along line A—A of FIG. 1.
Figure 8:
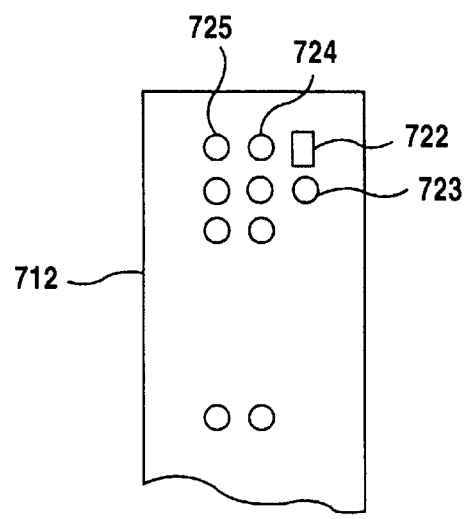
FIG. 8 is a sectional view taken along line B—B of FIG. 1.
Figure 9:
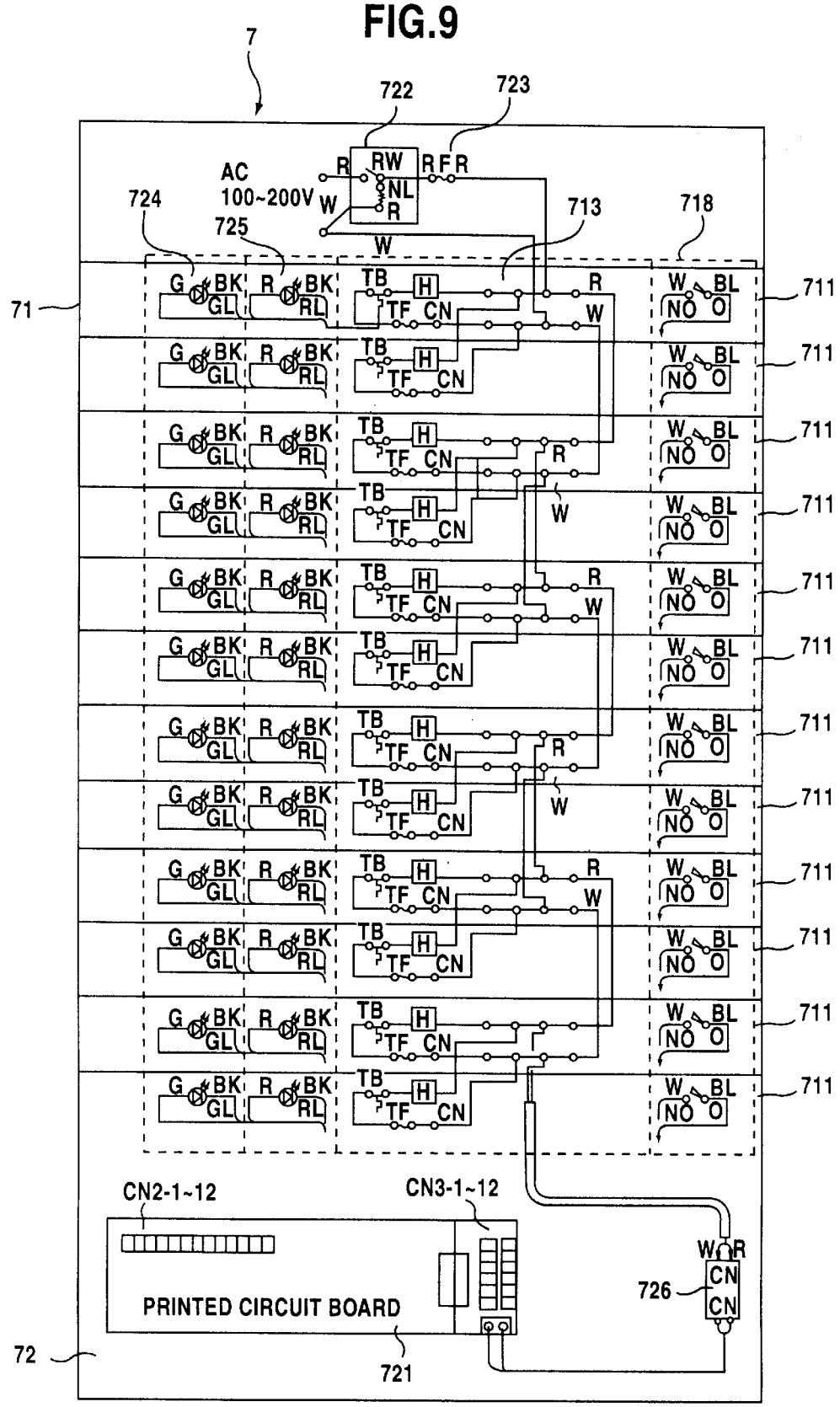
FIG. 9 is a wiring diagram totally showing the furnace for a heat-reserving container of FIG. 5.
Figure 10:
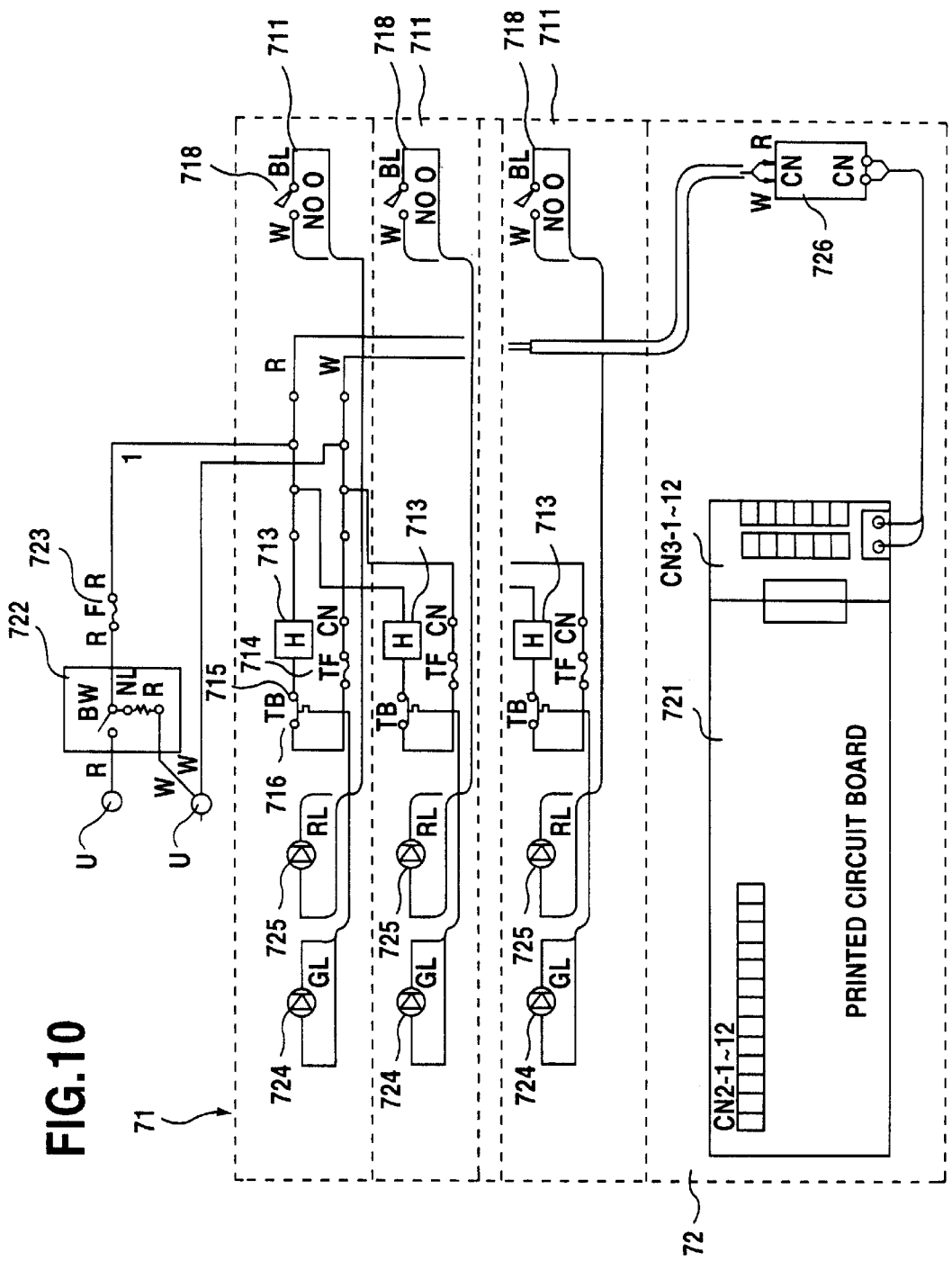
FIG. 10 is an enlarged wiring diagram showing the main portion of FIG. 9.
Figure 11:
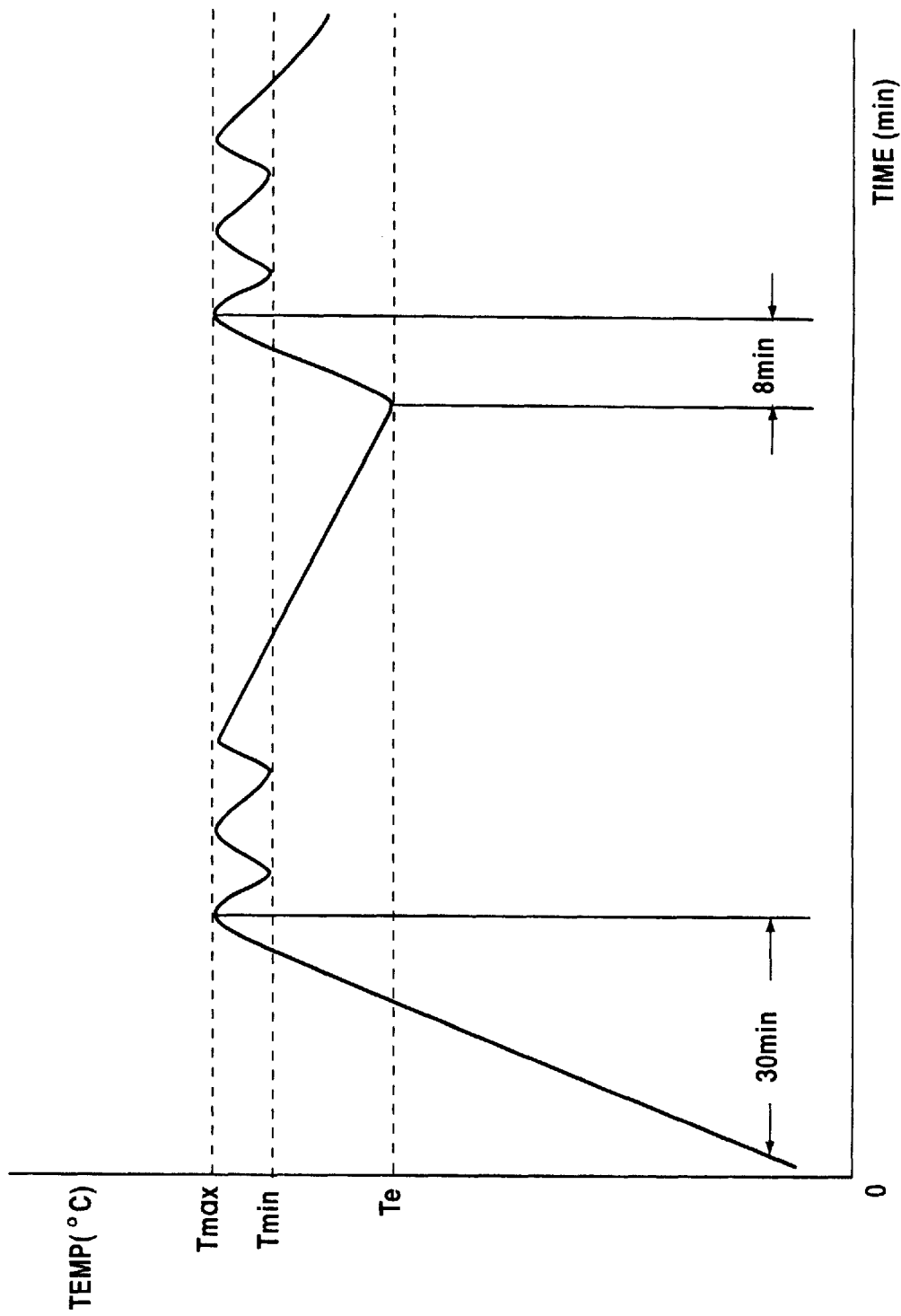
FIG. 11 is a graph showing the control of the temperature of the furnace for a heat-reserving container of FIG. 5.
Figure 12:
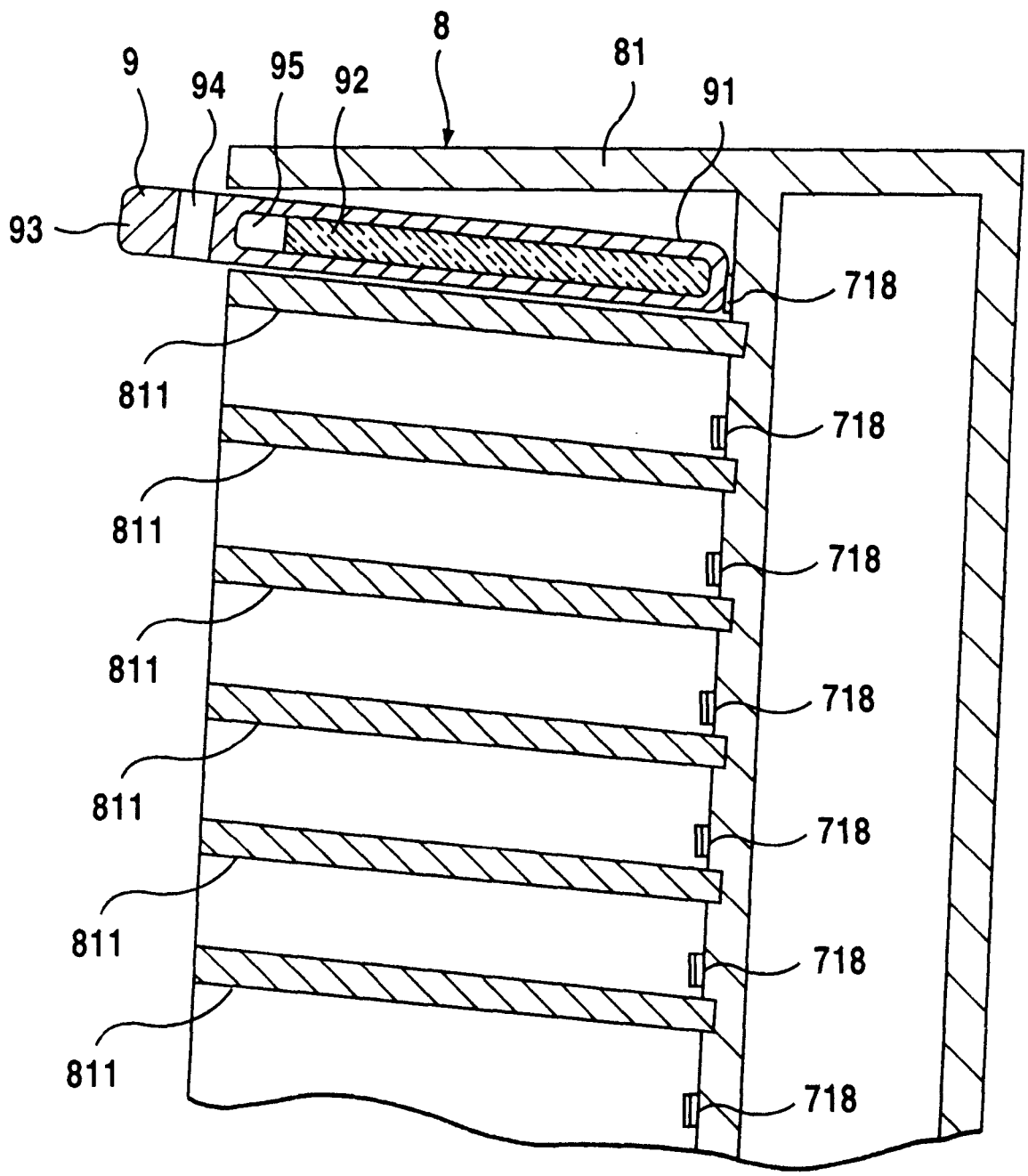
FIG. 12 is a cross-sectional view of a furnace for a heat-reserving container for pizza according to another embodiment of the present invention.

FIG. 5 outlines a furnace for a heat-reserving container for pizza according to the present invention, FIG. 6 outlines a rack plate, FIG. 7 is a sectional view taken along line A—A of FIG. 1, FIG. 8 is a sectional view taken along line B—B of FIG. 1, FIG. 9 is a wiring diagram totally showing the furnace for a heat-reserving container of FIG. 5, FIG. 10 is an enlarged wiring diagram showing the main portion of FIG. 9, FIG. 11 is a graph showing the control of the temperature of the furnace for a heat-reserving container of FIG. 5, and FIG. 12 is a cross-sectional view of a furnace for a heat-reserving container for pizza according to another embodiment of the present invention.

In FIGS. 5 and 6, a furnace 7 is formed into a multi-layer state constructed from rack plates 711, and is composed of a furnace body 71 having spaces 712 each for storing and heating the above-mentioned heat-reserving reserving containers 4, 5, 6, and 9 for pizza, and a control box 12.

The multi-layer of the rack plates 714 accommodates a heater 712, to which a temperature fuse 714 and thermo-switches 715 and 716 for regulating the upper and lower limits are connected, Printed plates 712 are laminated onto the control box 72 for the purpose of individually or mutually controlling a plurality of the spaces 712 for storing the heat-reserving container mentioned above.

In FIG. 7, a dividing plate 717 is provided on an inner part of the furnace body 71, on which a limit switch 718 is placed opposite to the space 712. In FIG. 8, on a front, panel portion of the control box 72, a power switch 772, a red lamp 724, which is linked to the fuse 723 and the limit switch 71B, at which shows existence or absence of the heat-reserving container 4 for pizza; and a green lamp, which shows whether the heat-reserving container 4 for pizza is heated to a prescribed temperature or not, are arranged.

FIG. 9 shows the total wiring of the furnace 7. The furnace 7 is connected to an alternative power source of AC 100 V or AC 200 V via an electrical outlet (not shown), and the power is supplied to the heaters 713 of the multi-layered racks having twelve racks via the power switch 722, and the fuse 723. Each of the limit switch 718 is connected to corresponding heater 713 possessed of racks 711 via a connector CN, and is also connected to each of red lamps 724 and each of the green lamps 725. Via a converter 726, the power is converted into DC 12 V, which is then supplied to a control circuit (not shown) of the printed circuit 721 of the control box 72.

The wiring of the multi-layered racks will now be described in detail by referring to FIG. 10. To the heater 713, a temperature fuse 714, a thermo-switch 715 for upper limit and a thermo-switch 716 for lower limit are connected in series. The thermo-switch 715 for upper limit and the thermo-switch 716 for lower limit are further connected to the green lamp 725. There is a construction that working the thermo-switch 715 for upper limit turns on the green lamp 725 and working the thermo-switch 716 for lower limit turns off the green lamp 725.

To the connector CN, which is connected to the heater 713 in series, the limit switch 718 is connected, and there is a construction that working the limit switch 718 turns on the electricity to the heater 713. The read lamp 724 is connected to the limit switch 719, and there is a construction that when the heat-reserving container 4 pushes the limit switch to turn on the a limit switch 718, the red lamp 724 is turned on accordingly, and when the heat-reserving container 4 is picked up to turn off the limit switch 718, the red lamp 724 is turned off, accordingly.

The working of the furnace 7 constructed as describer above will be described by referring to FIG. 11.

First, in the initial state where the furnace 7 gets cold, the heat-reserving container 4 is inserted into the rack 711. At this time, since the electricity is turned on to the heater 713, the rack plate 711 is heated to a prescribed upper limit temperature, $T_{max}$ (e.g., approximately 110° C.) for a period of an initial heating time (e.g., 30 minutes). If there are differences in heating temperatures, depending upon free air temperature, and racks 711, each of the racks 711 is individually heated until the thermo-switch 715 for upper limit is worked.

Subsequently, since the electricity is gone off when the temperature reaches the prescribed upper limit temperature, $T_{max}$, the temperature of the rack plate 711 is gradually decreased. Decreasing the temperature of the rack plate 711 to a prescribed lower limit temperature, $T_{min}$ (e.g., approximately 100° C.) works the thermo-switch 713 so that the electricity is turned on to the heater 713 to thereby heat the rack plate 711 again. This makes Meanwhile, according to an increase in the temperature of the rack plate 711, the heat-reserving container 4 for pizzas is heated. When the temperature of the space 712 reaches the prescribed temperature, the thermo-switch 715 breaks the electricity to the heater 713 and, at the same time, the green lamp 725 is turned on, telling the completion of the heating.

Any heat-reserving container 7 for pizza stored in the space 712, at which both of the red lamp 724 and the green lamp 725 are turned on, among the spaces formed into multi-layer can be taken out for the delivery.

The time required for starting the delivery and recycling the heat-reserving container 4 for pizza is varied depending upon the distances to the aimed site, and the traffic conditions and, thus, the degree of the heat-reserving container 4 for pizza getting cold is varied.

Each of the rack plates 711 individually controls the temperature of the heat-reserving container 4 for pizza to increase it to the prescribed temperature. Accordingly, in comparison with the total regulation type, the individual regulation in this embodiment is advantageous in that it is economic and requires less power with less wastefulness.

According to the construction described above, since the entire surface of the flat portion held by the plane surface of the case 41 in which the disk 41 made of a resin having a property of repetition of discharging a heat with a stable cycle is in contact with the container 2, the temperature of the pizza can be uniformly maintained, the rapid cooling of the pizza can be prevented, and the pizza can be delivered in the state as it is fresh from the oven.

Furthermore, by the construction that furnace for heating the recycled heat-reserving container again is formed into a multi-layer and the temperature is regulated at every layers, the power used can be less, and thus economic advantage can be obtained.

In an embodiment shown in FIG. 12, a furnace 8 for heating a heat-reserving container for pizza is constructed so that a slope is provided on the multi-layered rack 811 of the furnace body 81 in such a manner that the height of the inlet side is higher than that of the inner part.

According to the furnace 8, when the heat-reserving container 4 for pizza described above is inserted in the furnace body 81, since the heat-reserving container 4 for pizza automatically moves towards the inner part due to the slope of the rack 811, the heat-reserving container 4 for pizza is securely inserted into the furnace body 81 and then is heat-reserved. What is more, since the heat-reserving container 4 for pizza is securely pushes the limit switch 718, the defective movement of the limit switch 718 can be prevented. In addition, since the handle 93 of the heat-reserving container 4 for pizza is never overheated due to the space 95 provided on the disk 92, the it possible to keep the temperature of the rack plate 711 within the prescribed temperature range of from the upper limit temperature $T_{max}$ to the lower limit temperature $T_{min}$.

Subsequently, when the heat-reserving container 4 for pizza is taken out for delivering the pizza, the electricity is gone off, leading to a gradual decrease in the temperature of the furnace 7. In the present invention, by means of the control box 72, the switching of the heater 713 (ON and OFF) is controlled at a relatively long timing not so as to decrease the temperature to a temperature suitable for taking the pizza (e.g., 80° C.). To be specific, when it takes 30 minutes, which is an average delivery time since the heat-reserving container 7 has been taken off, a timer (not shown) of the control box 72 is worked so that an electricity is turned on to the heater 713 again for a re-heating time such as 8 minutes, whereby the temperature or furnace 7 is again heated to the upper limit temperature of $T_{max}$, and then the heat furnace 7 is ready for use. The re-heating time may be ⅓ the initial heating time or less, because the furnace 7 is maintained at an appropriate temperature.

When the delivery had been completed, and then the heat-reserving container 4 for pizza recycled from the deliver is inserted in the space 712 of the furnace 7, which can be ready for use, the limit switch 717 provided on the dividing wall is turned on, then the red lamp 724 is turned on and, at the same time, an electricity is turned on to the heater 713. heat-reserving container 4 for pizza can be taken out in a safety mariner.

Various mortifications of the embodiments can be made without departing from the scope of the present invention, for example, the dishes, which make up the heat-reserving container 5 for pizza may not necessarily have the same shapes, an may be connected asymmetrically. Instead of the supporting rods 53, an air loophole may be provided on the case 31. Furthermore, it is, of course, possible to provide heaters 713 not only on the circumferences, but also on the central portion of the rack palates; 711, depending upon the size of the rack plates 711.

As described above, in a heat-reserving container for pizza according to the first aspect of the present invention which comprises a disc case having a flat circular portion, with a resin-made heat reservoir stored therein, the entire surface of the pizza can be in contact with the flat portion of the heat-reserving container.

In the heat-reserving container for pizza having a construction that a plurality of supporting members, which are pierced through the heat reservoir and which communicate insides of said flat disk portion with each other according to the second aspect of the present invention, even if the air within the case is swelled by heating, the flat surface can be maintained by the supporting members, leading to the maintenance of good heat-reserving effect.

In the heat-reserving container for pizza having a construction on that a through-hole is formed into the case and only a gas is penetrated into the through-hole according to the third aspect of the present invention, even if the air within the case is swelled by heating, the flat surface can be maintained by emitting the air within the case to atmosphere, leading to the maintenance of good heat-reserving effect.

In the heat-reserving container for pizza having a construction that handle is provided on said case and, at the same time, a hole for handle is provided inside of the said handle so that a prescribed space is formed between the case inside of the hole for handle and the disk according to the fourth aspect of the present invention, the heat-reserving container for pizza can be operated with easier and with safety, because the heat from inner space is insulated.

In the furnace for the heat reserving container for pizza mentioned above comprising heating plates each having an interval capable of storing the heat-reserving container for pizza to form multi-layered racks, each heating plate having a heater accommodated therein whose temperature is controlled individually according to the fifth aspect of the present invention, the heat-reserving container for pizza recycled from the delivery can be heated to an appropriate temperature. Furthermore, since the furnace individually controls the heating of the heat-reserving containers for pizza depending on the temperature of the heat-reserving container, a consumption of the electricity may be reduced, thus, the furnace is assumed to be economic.

In the furnace for the heat-reserving container for pizza having a construction that each of the multi-layer racks has a slope where the height of the inlet side is higher than that of the inner part according to the sixth aspect of the present invention, the heat-reserving container for pizza is securely inserted into the furnace body and is heat-reserved and, what is more, since the heat-reserving container for pizza is securely pushes the limit switch, the defective movement of the limit switch can be prevented.

In the furnace for the heat-reserving container for pizza having a construction that each of said heater is heated to a predetermined upper limit temperature in an initial state over a period of a initial heating time, and after the temperature reach the upper limit temperature, the heater is heated for a heating time, which is ⅓ the initial heating time or less, after the same period as the initial heating time is elapsed according to the seventh aspect of the present invention, the furnace can be maintained at the temperature most suitable for the heat-reserving container for pizza, leading to the most efficient operation.

While the invention has been described in detail and with reference to specific, embodiments thereof, it will be apparent to one skilled in the art that various changes and modifications can be made therein without departing from the spirit and scope thereof.

What is claimed is:

1. A heat-reserving container for pizza comprising a disk-shaped case having a flat circular portion, with a resin-made heat reservoir stored therein, wherein a plurality of supporting members pierce through the heat reservoir and connect insides of said flat circular portion with each other.

2. A heat reserving container for pizza comprising a disk-shaped case having a flat circular portion, with a resin-made heat reservoir stored therein, wherein a through-hole is formed into the case.

3. The heat-reserving container for pizza as claimed in claim 1, wherein a through-hole is formed into the case and only a gas is penetrated into the through-hole.

4. A heat reserving container for pizza comprising a disk-shaped case having a flat circular portion, with a resin-made heat reservoir stored therein, wherein a handle provided with a hole is projected on the outskirts of the case, so that the hole is positioned out of a heat furnace when heating the heat reserving container in the heat furnace.

5. A heat reserving container for pizza comprising a disk-shaped case having a flat circular portion, with a resin-made heat reservoir stored therein, wherein a handle provided with a hole is projected on the outskirts of the case and a prescribed space is formed between the heat reservoir and the case at a location corresponding to an inside portion of the handle.

6. A heat reserving container for pizza comprising a disk-shaped case having a flat circular portion, with a resin-made heat reservoir stored therein, wherein a plurality of supporting members pierce through the heat reservoir and connect insides of said flat circular portion with each other, and wherein a handle provided with a hole is projected on the outskirts of the case, so that the hole is positioned out of a heat furnace when heating the heat reserving container in the heat furnace.

7. A heat furnace apparatus for heat-reserving containers for pizza comprising a furnace and at least one heat-reserving container for pizza as claimed in claim 1, said furnace comprising heating plates each having an interval capable of storing said at least one heat-reserving container for pizza to form multi-layered racks, said at least one heat-reserving container being stored in one of said intervals, each heating plate having a heater accommodated therein whose temperature is controlled individually, wherein a handle provided with a hole is projected on the outskirts of the case of said at least one heat-reserving container for pizza, so that the hole is positioned out of the furnace when heating the heat reserving container in the furnace.

8. The heat furnace apparatus as claimed in claim 7, wherein each of the multi-layered racks has a slope where the height of the inlet side is higher than that of the inner part.

9. The heat furnace as claimed in claim 7, wherein each of said heater is heated to a predetermined upper limit temperature in an initial state over a period of a initial heating time, and after the temperature reach the upper limit temperature, the heater is heated for a heating time, which is ⅓ tile initial heating time or less, after the same period as the initial heating time is elapsed.

* * * * *